(12) United States Patent
Wu

(10) Patent No.: US 8,730,576 B2
(45) Date of Patent: May 20, 2014

(54) MICRORETARDER FILM

(75) Inventor: Jung-Tsung Wu, Tainan (TW)

(73) Assignee: Futis International Ltd., Tainan (TW)

( * ) Notice: Subject to any disclaimer, the term of this patent is extended or adjusted under 35 U.S.C. 154(b) by 197 days.

(21) Appl. No.: 13/357,807

(22) Filed: Jan. 25, 2012

(65) Prior Publication Data

US 2012/0236411 A1   Sep. 20, 2012

(30) Foreign Application Priority Data

Mar. 18, 2011   (TW) .............................. 100109439 A

(51) Int. Cl.
  *G02B 27/28*   (2006.01)
(52) U.S. Cl.
  USPC ...................................... 359/492.01
(58) Field of Classification Search
  USPC ...................... 359/485.05, 489.07, 492.01
  See application file for complete search history.

(56) References Cited

U.S. PATENT DOCUMENTS

| | | | |
|---|---|---|---|
| 7,950,798 B2* | 5/2011 | Johnson et al. | 351/159.59 |
| 2004/0263974 A1* | 12/2004 | McDonough et al. | 359/487 |
| 2005/0168816 A1* | 8/2005 | Fukaishi et al. | 359/465 |
| 2006/0146404 A1* | 7/2006 | Ioki et al. | 359/485 |
| 2008/0198456 A1* | 8/2008 | Sharp | 359/499 |
| 2010/0302798 A1* | 12/2010 | Papakonstantinou et al. | 362/601 |
| 2011/0157698 A1* | 6/2011 | Yoshimi | 359/462 |
| 2011/0194179 A1* | 8/2011 | Hsu | 359/465 |

OTHER PUBLICATIONS

H. Seiberle et al., "Photo-Aligned Anisotropic Optical Thin Films", SID 03 Digest, pp. 1162-1165, 2003.*
B. van der Zande et al., "Technologies Towards Patterned Optical Foils", SID 03 Digest, pp. 194-197, 2003.*

* cited by examiner

*Primary Examiner* — Frank Font
(74) *Attorney, Agent, or Firm* — Chih Feng Yeh; Huntington IP Consulting Co., Ltd.

(57) ABSTRACT

The present invention provides a micro-retarder film for a 2D/3D image switchable display. The micro-retarder film comprises a first homogenous layer, a microstructure phase layer with a plurality of retarder patterns formed on the first homogenous layer alternately, and a second homogenous layer formed on the microstructure phase layer.

9 Claims, 5 Drawing Sheets

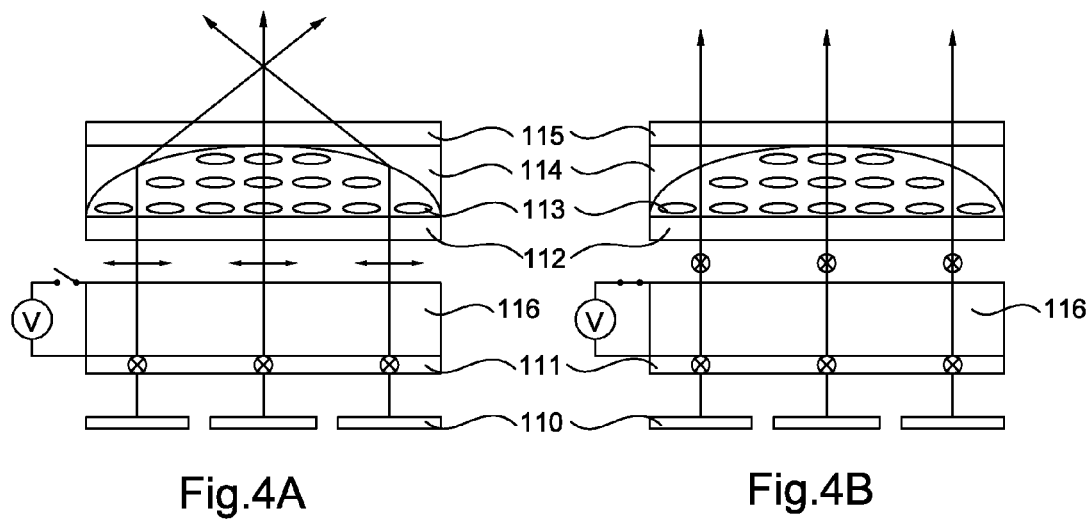

MICRORETARDER FILM

TECHNICAL FIELD

The present invention generally relates to a parallax barrier and, more particularly, to a parallax barrier made of a microretarder film.

BACKGROUND

Flat panel display has been widely used in applications for displays with a higher resolution, a wider color gamut and more response speed. As humans desire that the most natural, most realistic, and a stereo images may be shown ultimately, so the stereo/three-dimensional (3D) image display technology has been considerable emphasis.

The original idea of the three-dimensional stereoscopic display technology is that the left and right eyes are accepted different images, respectively. Generally speaking, relative position of objects in space is determined correctly by the combination of a number of depth cues. The depth cues include binocular parallax, adaptation of the human eye, motion parallax, perspective, the size relationship between observing objects, material of objects. That is, the stereoscopic display must have at least two characteristics of the binocular disparity and motion parallax, wherein the depth of information is more accurately determined by the binocular disparity. Due to a displacement (interval about 65 mm) between two eyes in the horizontal direction, binocular disparity is created such that images seen by two eyes have a slightly different, and therefore, contents of the received image are also slightly different. The motion parallax indicates as the viewer's eye position moves, because viewing angle changed, the contents of the eye received are also different. Therefore, to receive three-dimensional image, individual images received by the left eye and right eye, respectively must be allowed only slight differences, and then fused into the brain to create the three-dimensional images with depth information. Currently, reconstruction for the 3D display stereo images are mostly designed based-on binocular disparity, wherein the images with different viewing angles are projected onto the left and right eye by using a special optical design, and then through the brain integrating the two images, which can be reconstructed the stereo images.

In the early, three-dimensional image display is mostly wearing glasses type stereoscopic display. Shutter glasses 3D display rate is playing images of the left and right eye viewing angles by refresh frequency 120 Hz or more. When the display is showing the left eye's frame, the left eye shutter glass will be open, and the right eye is covered. When the display is showing the right eye's frame, the right eye shutter glass will be open, and the left eye is covered. With fast switching the left and right eye information, the left eye and the right eye can see the correct frame (picture), respectively. After a persistence of vision with the visual integration by the brain, it can be showing the stereo depth image.

However, the above-mentioned wearing glasses type stereoscopic display needs to wear the special equipment which will often impede the nature vision of human. Therefore, in recent years, a naked-eye stereoscopic image display is gradually developed. The naked-eye 3D display can be implemented by two types of the time multiplexing and spatial multiplexing. Time multiplexing is utilized by a directional backlight and a fast response panel, quickly displaying the left and right eye images such that the viewer's left and right eye can see left and right eye images, respectively. Spatial multiplexing is to show the left and right eye images simultaneously, at the expense of the frame resolution, which is implemented by the Parallax barrier and the Lenticular lenses. The parallax barrier is utilizing a grating to control the forward direction of light, while the Lenticular lens is using a different refractive index to control the direction of light.

Moreover, cylindrical lens is composed of many thin straight strip convex lens arranged in a row along one axis direction, which generates different views of the left and right eyes by an light refraction, and which is utilizing light refraction to achieve the purpose of splitting, less loss of light and better brightness. However, as the production error, surface irregularity of cylindrical lens or other factors, there will generate stray light, which leads to some vague three-dimensional images, and thus affecting the overall 3D image display. Besides, the parallax barrier is used to restrict the light emitting out of certain angle by using the whole barriers, and only view images in specified angle send to the right and left eyes, respectively, to produce three-dimensional images.

Moreover, a conventional three-dimensional display device can only show three-dimensional images, but without switching between the plane (two dimensional) images and the stereo (three dimensional) images. Therefore, a stereo images display device has been developed for switching to display three-dimensional images and the plane images. Currently, a general localization 2D/3D switching technology is mainly using Parallax barrier and the Lenticular lenses. Parallax barrier and the Lenticular lenses can be placed in the front of the display panel or placed between the display panel and the backlight module. For example, a switchable 2D/3D parallax barrier display comprises a parallax barrier 102, a display panel 101 and a backlight module 100, shown in FIG. 1a and FIG. 1b. The parallax barrier 102 is disposed in the front of the display panel 101. When the image contents display as 3D images in some regions, it produces the parallax grating effect on the corresponding region 102a, namely, the 3D display mode, shown in FIG. 1a. When the image contents display as 2D images, the parallax grating effect disappears on the corresponding location (region) 102b, shown in FIG. 1b. The left eye and the right eye are seen the same pixel, as the same normal 2D display. Another mode is 2D/3D switchable display Lenticular lens, which has similar functions with the 2D/3D switchable Parallax barrier display. In such case, in the 2D/3D switchable display Lenticular lens, the Lenticular lenses 103 replaces the Parallax barrier 102, shown in FIG. 2a and FIG. 2b. The Lenticular lenses 103 is disposed in the front of the display panel 101. When the image contents display as 3D images in some regions, it produces the Lenticular lens effect on the corresponding region 103a, namely, the 3D display mode, shown in FIG. 2a. When the image contents display as 2D images, the Lenticular lens effect disappears on the corresponding location (region) 103b, shown in FIG. 2b. The left eye and the right eye are seen the same pixel, as the same normal 2D display.

In the 2D/3D switchable Parallax barrier display, as the liquid crystal has the intrinsic ability to make light penetrating or not, it is one of the easiest way to achieve the regional Parallax barrier by using the LCD panel. For example, in a 2D/3D switchable Parallax barrier display, two LCD panels are disposed in the front of the backlight module, which the first LCD panel is as the parallax grating. When the display panel is to display 3D contents, black and white stripes are displayed on the corresponding areas of the front LCD panel. When the display panel displays 2D contents, white frames, complete penetration of light, are displayed on the corresponding areas of the front LCD panel. Therefore, the displaying contents of the front LCD panel can be controlled to achieve the switching function of 2D/3D regionalization.

In the 2D/3D switchable Lenticular lens display, it includes regionalization 2D/3D switching Lenticular lens, which includes two types switching LCD panel, active switching Lenticular lens LCD panel and passive switching Lenticular lens LCD panel. For example, the active switching Lenticular lens display technology is well developed by Philips Corporation. Liquid crystal is poured into the internal of a columnar lens (eg, concave lens) 114, and enclosed by the upper and lower glass substrates 115 and 112, and a polarization film 111 is configured under the lower glass substrate 112 and display pixels 110 are disposed under polarization film 111. As the liquid crystal is a birefringent material (refractive index N and n), which can by applied a voltage (V) to change its refractive index. The appropriate refractive index of the liquid crystal material may be chosen to match with a refractive index (eg, for n) of the lens 114. When no voltage is applied on the columnar lens 114, the refractive index of the liquid crystal layer is N, different from the refractive index n of the lens, and thereby resulting in a refractive index difference. As the light passes through the active switching columnar lens 114, it will change the propagating direction of light due to the refractive index difference, such creating a 3D mode display, shown in FIG. 3a. When a voltage is applied on the active 2D/3D switching columnar lens 114, alignment of the liquid crystal is changed and the refractive index of the liquid crystal layer 113 is n, the same as the refractive index n of the lens. As the light passes through the display pixels 110, it propagates along the original light incident direction, such creating a 2D mode display, shown in FIG. 3b. Therefore, in such scheme, it is optionally applying the voltage to the columnar lens 114 to generate a 2D/3D switching effect.

In the passive switching Lenticular lens LCD panel scheme, it utilizes a fixed birefringence (refractive index N and n) columnar lens 114 and a switching liquid crystal layer 116 to control the propagating direction of light. This technology is utilized by the switching liquid crystal layer 114 to determine whether the columnar lens 114 works or not, so it belongs to a passive mode of operation. As a voltage does not apply to a switching liquid crystal layer 116, for example TN, assume polarization direction of the incident light passing through the polarization film 111 is changed from zero degree into 90 degree after passing through the witching liquid crystal layer 116. Meanwhile, the refractive index of the liquid crystal layer 113 of the columnar lens 114 is N, different from the refractive index n of the lens, and thereby resulting in an optical path difference. It will change the propagating direction of light to produce a Lenticular lens effect, namely creating a 3D mode display, shown in FIG. 4a. As a voltage is applied to the switching liquid crystal layer 116, alignment of TN liquid crystal is then changed, and polarization direction of the incident light is still zero degree after passing through the switching liquid crystal layer 116. Meanwhile, the refractive index of the liquid crystal layer 113 of the columnar lens 114 is n, the same as the refractive index n of the lens, and without changing the propagating direction of light, namely creating a 2D mode display, shown in FIG. 4b. Therefore, in such scheme, it utilizes a partially controlling the voltage to the witching liquid crystal layer to reach the purpose of a regionalization 2D/3D switching effect.

As above-mentioned, in the conventional 2D/3D switching scheme, Lenticular lens is required to combine at least one liquid crystal layer, and must be applied a voltage to the columnar lens, in order to achieve regional 2D/3D switching effects. Therefore, the manufacturing cost is more expensive, and the scheme is complex and prone to produce bad switching or display. In view of these shortcomings of the traditional scheme, the present invention provides a superior parallax barrier/grating than the prior arts in order to overcome these shortcomings.

SUMMARY OF THE INVENTION

Based on the above, an object of the present invention is to provide a micro-retarder film used for a 2D/3D images switching display device, wherein the micro-retarder film can be as a parallax barrier or applied to a polarizing glasses 3D display to be as a micro-retarder film. It has advantages of low cost and simple process.

According to an aspect of the present invention, the present invention provides a micro-retarder film which comprises a first homogenous layer; a microstructure phase layer, having a plurality of phase retarder patterns formed on the first homogenous layer; and a second homogenous layer formed on the microstructure phase layer.

Material of the first homogenous layer and material of the microstructure phase layer is the same which are formed by a transmutation treatment or a surface modification process, wherein the second homogenous material layer is filled into the intervals between the plurality of phase retarder patterns.

The present invention provides a micro-retarder film to overcome shortcomings of the traditional scheme, and effectively switch 2D/3D images and highly reduce cost.

BRIEF DESCRIPTION OF THE DRAWINGS

The components, characteristics and advantages of the present invention may be understood by the detailed descriptions of the preferred embodiments outlined in the specification and the drawings attached:

FIGS. 4a and 4b illustrate a passive Lenticular lens and switching liquid crystal panel display;

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

References in the specification to "one embodiment" or "an embodiment" refers to a particular feature, structure, or characteristic described in connection with the preferred embodiments is included in at least one embodiment of the present invention. Therefore, the various appearances of "in one embodiment" or "in an embodiment" do not necessarily refer to the same embodiment. Moreover, the particular feature, structure or characteristic of the invention may be appropriately combined in one or more preferred embodiments.

In the conventional 2D/3D switching scheme, Lenticular lens is required to combine at least one liquid crystal layer, and must be applied a voltage to the Lenticular lens, to achieve regional 2D/3D switching effects. Therefore, the manufacturing cost is more expensive, and the scheme is complex and prone to produce bad switching or display. In view of these shortcomings of the traditional scheme, the present invention provides a micro-retarder film superior than the prior arts which has advantages of low cost and simple process. The micro-retarder film is used to be a Parallax barrier of a 2D/3D image switching display device which includes three layers structure, a first layer of a transparent layer 59, a second layer of a microstructure phase layer 58 with a plurality of phase retarder patterns formed on the first transparent layer alternately, and a third layer of a second transparent layer 56 formed on the microstructure phase layer 58 and filled into spacing between the plurality of retarder patterns.

Figures 1A, 1B:
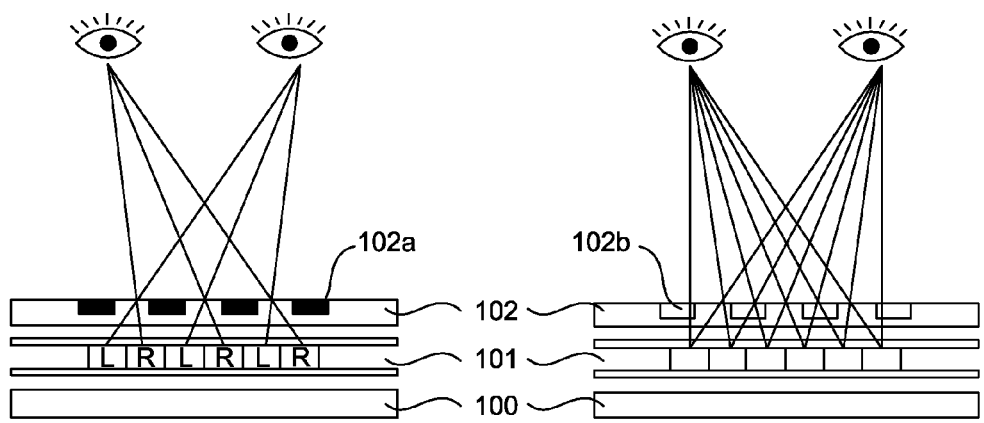
FIGS. 1a and 1b illustrate a switchable 2D/3D parallax barrier display.
Figures 2A, 2B:
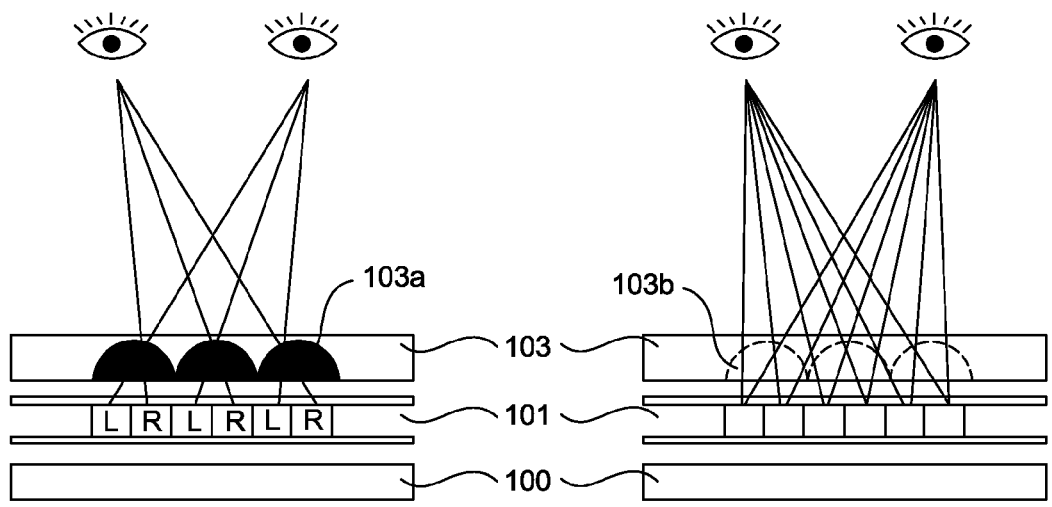
FIGS. 2a and 2b illustrate a switchable 2D/3D Lenticular lens display.
Figures 3A, 3B:
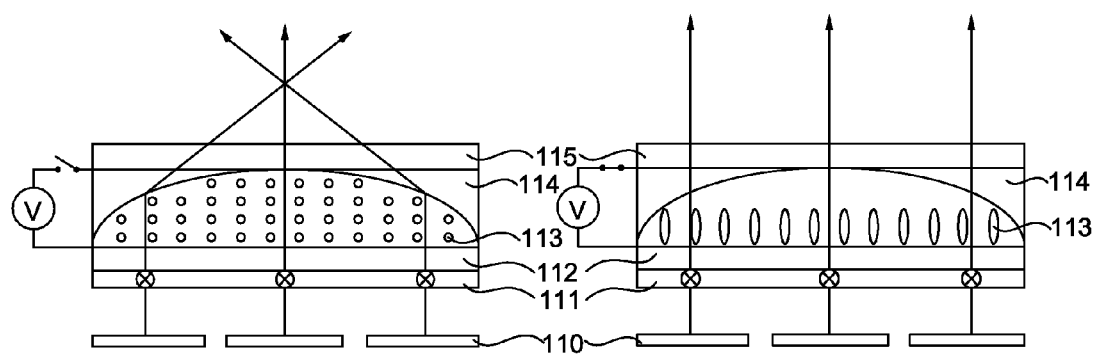
FIGS. 3a and 3b illustrate an active switchable 2D/3D Lenticular lens display.
Figure 5A:
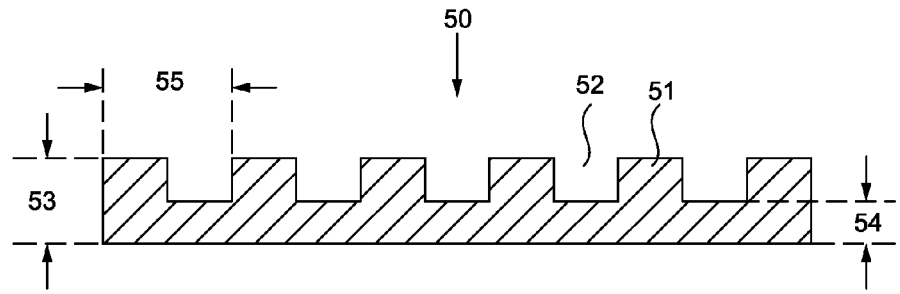
FIG. 5a illustrates a sectional view of a microstructure phase thin film pattern by a tension-assisted rolling process according to the present invention.

The manufacturing method and steps of the micro-retarder film are described below. Firstly, a non-homogeneous material layer is prepared, which is a microstructure phase layer. The microstructure phase layer (Micro-phase thin-film layer structure) will be changed as a homogeneous material after encountered light, so that passing through light causes a phase modulation. Material of the microstructure phase layer includes polyvinyl acetate (PVA), Triacetate cellulose (TAC), Poly Carbonate (PC) or Cellulose Acetate Propionate (CAP). Next, the microstructure phase layer is through a tension-assisted rolling (laminating) process to form a microstructure phase thin film pattern 50, shown in FIG. 5a. Polymer material of the microstructure phase layer is utilizing a tension-assisted rolling process to form an integral the microstructure phase thin film, with a depth of the concave-convex pattern. The microstructure phase thin film pattern 50 includes a plurality of grooves (openings) portion 52 and a plurality of phase retarder patterns 51 arranged alternately across the grooves portion 52. Spacing 55 of the plurality of phase retarder patterns 51 is about 150~350 micron ($\mu m$), and thickness 53 of the plurality of phase retarder patterns 51 is about 25~200 micron.

In a preferred embodiment, width of the grooves (openings) portion 52 is about 75~150 micron ($\mu m$), and thickness 54 of the thin-film layer underlying the grooves (openings) portion 52 is about 10~50 micron.

Figure 5B:
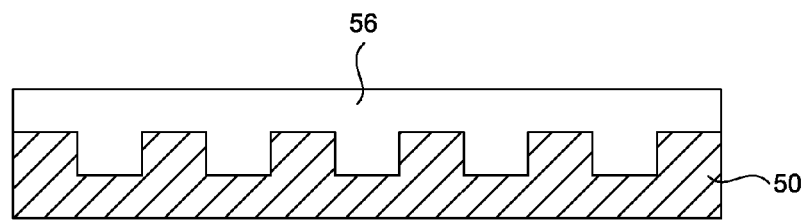
FIG. 5b illustrates a sectional view of a first homogenous material layer formed on the microstructure phase thin film pattern according to the present invention.

Subsequently, a first homogenous material layer 56 is formed on the microstructure phase thin film pattern 50 and filled into the grooves (openings) portion 52 between intervals of the plurality of phase retarder patterns 51, shown in FIG. 5b. Material of the first homogenous material layer 56 includes ultraviolet (UV) curable polymer or two-liquid type curable polymer, which may be made by a coating process.

Figure 5C:
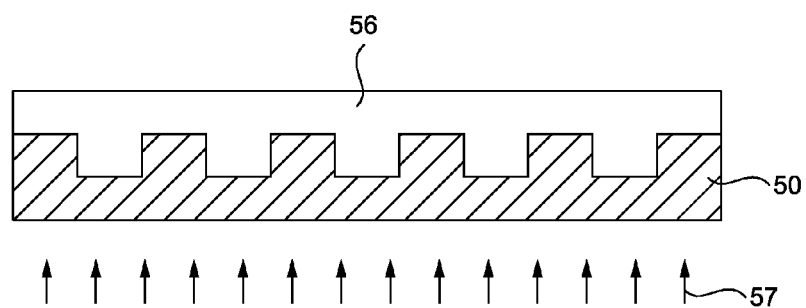
FIG. 5c illustrates a sectional view of irradiating light on backside of the microstructure phase thin film pattern according to the present invention.

Finally, a surface modification or a transmutation treatment of backside of the microstructure phase thin film pattern 50 is performed, shown in FIG. 5c. In one embodiment, the surface modification or a transmutation treatment is, for example a thermal treatment by utilizing energy, and the thermal treatment includes but not limited to an annealing, an electron beam quenching, a high-frequency quenching, a high-pressure discharge, a plasma surface treatment, a laser exposure (irradiating) etc. In one embodiment, the surface modification process or the transmutation treatment is utilizing the light 57 with a specific energy irradiating backside of the microstructure phase thin film pattern 50. It utilizes energy to perform a modification process for such structure broken up into homogeneous. Illumination intensity and time of laser exposure, and the wavelength of laser light depend on the actual applications or materials. The microstructure phase thin film pattern 50 can be treated by plasma surface treatment to reach its depth greater than the thickness 54 above the backside surface. Material is transferred into the homogenous material after the surface modification process. By controlling groove depth, it can make the quality modification to the bottom completely and at least reaching to the bottom of the grooves, until the microstructure phase thin film under the grooves portion 52 has a homogeneous property completely, and thereby forming a second homogeneous material layer 59. Thus, the micro-retarder film structure of the present invention is then completed, shown in FIG. 5d. The second homogeneous material layer 59 and the first homogeneous material layer 56 are also homogenous materials which do not cause optical phase change, but microstructure phase layer 58 will cause optical phase change. Thickness of the second homogeneous material layer 59 is less than that of the first homogeneous material layer 56.

Figure 5D:
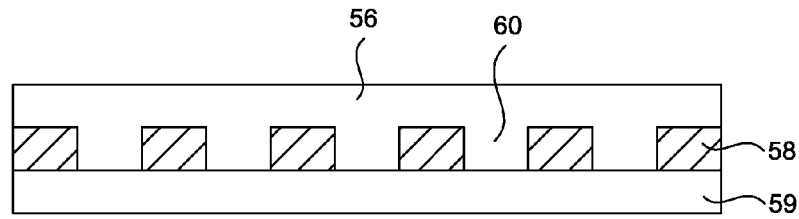
FIG. 5d illustrates a sectional view of a micro-retarder film according to the present invention.

The micro-retarder film structure of the present invention is shown in FIG. 5d, and it can provide as a parallax barrier of a 2D/3D images switching display device. In one embodiment, the micro-retarder film of the present invention can attach to a general LCD, the image of the left eye (L) and the right eye (R) will be separated by the polarization direction of light. The micro-retarder film of the present invention includes a phase delay portion 58 and a non-phase-delay portion 60. The phase delay portion 58 includes a non-illuminated microstructure phase thin film such that the passing through light will create a phase difference. The non-phase-delay portion 60 is a homogenous material such that the passing through light does not create a phase difference. For example, a 2D/3D image switching display device uses two-layer liquid crystal panel, and the micro-retarder film of the present invention is sandwiched between the two panels. In one embodiment, the micro-retarder film of the present invention is constructed by the phase delay portion ($\lambda/2$ phase difference, $\lambda$ is wavelength of incident light) 58 and the non-phase-delay portion 60 (zero phase difference) which are arranged according to specific patterns. Switching panel is to allow the passing through light to be conversion between zero degree polarization and 45 degree polarization. When the zero degree polarization light passes through zero phase delay portion 60, it still remains zero degree polarization state. When the zero degree polarization light passes through $\lambda/2$ phase delay portion 58, zero degree polarization incident light will be transferred into 90 degree polarization state. Meanwhile, if light passes through the polarizing film with zero degree polarization direction, it will show transparent and black two patterns which are the same as patterns configuration of the micro-retarder film, namely creating a parallax barrier effect. When the 45 degree polarization light emitted from the switching panel passes through zero phase delay portion 60, it still remains 45 degree polarization state. Meanwhile, if light passes through $\lambda/2$ phase delay portion 58, it still remains 45 degree polarization direction due to optical axis of 45 degree polarization light parallel with $\lambda/2$ phase delay portion 58. Meanwhile, light passes through the polarizing film with zero degree polarization direction does not produce transparent and black two patterns, and therefore without creating a parallax barrier effect. The micro-retarder film of the present invention can combined with the switching panel to reach the switching effect of 2D/3D.

The micro-retarder film of the present invention is not limited to the scheme of the above-mentioned 2D/3D image switching display device (using two-layer liquid crystal panel), others 2D/3D image switching display panel devices can be applied.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A micro-retarder film, comprising:
   a first homogenous layer;
   a microstructure phase layer, having a plurality of phase retarder patterns formed on said first homogenous layer; and
   a second homogenous layer formed on said microstructure phase layer;
   wherein a material of said first homogenous layer and material of said microstructure phase layer is the same.

2. The micro-retarder film of claim 1, wherein a thickness of said first homogenous layer is about 10~50 micron.

3. The micro-retarder film of claim 1, wherein said first homogenous layer and said microstructure phase layer are formed by a transmutation treatment, wherein said transmutation treatment includes a thermal treatment.

4. The micro-retarder film of claim 3, wherein said thermal treatment includes an annealing, an electron beam quenching, a high-frequency quenching, a high-pressure discharge, a plasma surface treatment or a laser irradiating.

5. The micro-retarder film of claim 1, wherein a material of said second homogenous layer includes ultraviolet (UV) curable polymer or two-liquid type curable polymer.

6. The micro-retarder film of claim 1, wherein a material of said microstructure phase layer includes polyvinyl acetate, Triacetate cellulose, Poly Carbonate or Cellulose Acetate Propionate.

7. The micro-retarder film of claim 1, wherein a thickness of said microstructure phase layer is about 25~200 micron.

8. The micro-retarder film of claim 1, wherein a spacing of said plurality of phase retarder patterns is about 150~350 micron.

9. The micro-retarder film of claim 1, wherein a width of said plurality of phase retarder patterns is about 75~155 micron.

* * * * *